United States Patent [19]
Mark et al.

[11] Patent Number: 5,337,143
[45] Date of Patent: Aug. 9, 1994

[54] LOOP CONTROLLER FOR MULTIPLEXED TRIAXIAL GYRO

[75] Inventors: John G. Mark, Pasadena; Daniel A. Tarzartes, West Hills, both of Calif.

[73] Assignee: Litton Systems, Inc., Beverly Hills, Calif.

[21] Appl. No.: 959,972

[22] Filed: Oct. 13, 1992

[51] Int. Cl.⁵ .............................. G01C 19/64
[52] U.S. Cl. ............................... 356/350
[58] Field of Search .......................... 356/350

[56] References Cited

U.S. PATENT DOCUMENTS

| | | |
|---|---|---|
| 5,033,854 | 7/1991 | Matthews et al. ............... 356/350 |
| 5,157,461 | 10/1992 | Page ............................ 356/350 |
| 5,189,488 | 2/1993 | Mark et al. .................... 356/350 |

FOREIGN PATENT DOCUMENTS

0288032 10/1988 European Pat. Off. .

Primary Examiner—Vincent P. McGraw
Attorney, Agent, or Firm—Elliott N. Kramsky

[57] ABSTRACT

A triaxial gyro system includes a loop controller for generating a multiplexed digital biasing waveform. The controller receives the multiplexed outputs of the three gyros in digital form from an analog-to-digital converter. The loop controller is arranged to generate a digital waveform for multiplexed driving of the phase modulators associated with the three gyros. Within the loop controller, the multiplexed gyro outputs are independently processed in such a way that a biasing waveform is generated which permits sequential driving of the phase modulators without any need for resetting buffer cycles.

14 Claims, 4 Drawing Sheets

LOOP CONTROLLER FOR MULTIPLEXED TRIAXIAL GYRO

BACKGROUND

1. Field of the Invention

The present invention relates to apparatus for measuring rotation rates about three orthogonal axes. More particularly, this invention pertains to a loop controller for use in a triaxial gyro of the type in which a multiplexing arrangement is employed for reducing system components.

2. Description of the Prior Art

The Sagnac interferometer is an instrument for determining rotation by measurement of the non-reciprocal phase difference generated between a pair of counterpropagating light beams. This instrument generally comprises a light source such as a laser, an optical waveguide consisting of several mirrors or a plurality of turns of optical fiber, a beamsplitter/combiner, a detector and a signal processor.

In an interferometer, the waves coming out of the beamsplitter counterpropagate along a single optical path. The optical waveguide is "reciprocal"; that is, any distortion of the optical path affects the counterpropagating beams similarly although they do not necessarily experience such perturbation at the same time or in the same direction. Time-varying perturbations may be observed where the time interval is comparable to the propagation time of the light around the optical waveguide whereas "non-reciprocal" perturbations affect the counterpropagating beams differently and according to the direction of propagation. Such non-reciprocal perturbations are occasioned by physical effects that disrupt the symmetry of the optical medium in which the two waves propagate. Two of the non-reciprocal effects are quite well known. The Faraday, or collinear magneto-optic effect, occurs when a magnetic field creates a preferential spin orientation of the electrons in an optical material whereas the Sagnac, or inertial relativistic effect, occurs when rotation of the interferometer with respect to an inertial frame breaks the symmetry of propagation time. The latter effect is employed as the principle of operation of a ring gyroscope.

It is known that the fringe or interference pattern formed by the counterpropagating beams of a gyro consists of two elements, a d.c. component and a component that is related (e.g. cosine function) to the cause of the phase difference between the beams. This phase difference provides a measure of the non-reciprocal perturbation due, for example, to rotation. As a consequence of the shape of the fringe pattern, when small phase differences are to be measured (e.g. low rotation rates), the intensity of the combined beam is relatively insensitive to phase difference as such difference occurs close to the maximum of the phase fringe pattern. Further, mere intensity of the composite beam does not indicate the sense or direction of rotation.

For the foregoing reasons, an artificially biased phase difference is commonly superimposed upon the counterpropagating beams. The biasing of the phase shift, also known as "non-reciprocal null-shift," enhances the sensitivity of the intensity measurement to phase differences. A maximum degree of sensitivity is achieved by shifting the operating point of the gyroscope to $\pm \pi/2$ (or odd multiples thereof). Furthermore, by alternating the bias between $+\pi/2$ and $-\pi/2$, two different operating points are observed. This enables the system to determine the sign of the phase difference and, thus, the direction of rotation.

In addition to phase modulation, the processing of an interferometer output commonly employs "phase hulling" that introduces an additional phase shift through a negative feedback mechanism to compensate for that due to the non-reciprocal (Sagnac) effect. Commonly, the negative feedback generates a phase ramp whose slope is proportional to the rate of rotation to be measured. In actual practice, a ramp whose height varies between 0 and $2\pi$ radians is employed as the nulling phase shift cannot be increased indefinitely due to voltage constraints.

U.S. patent Ser. No. 4,705,399 of Graindorge et al. discloses a digitally-based arrangement that employs a "stairstep" waveform. The height of each step is equal to the measured phase difference while the width or period of each is the group delay time of the optical coil. On the average, the slope of the ramp is equivalent to the measured non-reciprocal phase difference per unit of time. This method is compatible with digital signal processing and enjoys many resulting advantages. The phase modulation may be directly added to the digital ramp through the synchronization offered by a digital signal processor. The (combined) signal ultimately controls the phase modulator that is positioned near one end of the optical fiber coil.

Many applications, including navigation, require rotation and position information with respect to the three orthogonal space axes. Accordingly, a triad of interferometers would then be required, one for sensing rotation about each of the rotation axes. The necessity of deploying multiple interferometers can greatly complicate the amount and complexity of associated signal processing electronics. One approach to simplifying the signal processing electronics and thereby reducing the cost of a triaxial fiber optic gyroscope is taught in U.S. patent Ser. No. 5,033,854 of Matthews et al. entitled "Multiplexed Fiberoptic Gyro Control" in which the amount and complexity of the control electronics are simplified and reduced by multiplexing the outputs of the three fiber optic gyros to derive angular and rotation rate data as well as drive signals for the phase modulators associated with the three gyro coils by means of a single processor. In that patent a plurality of gyros is sampled at a rate of $n\tau$ where $\tau$ is the gyro optic transit time and n is an integer. The sampled signal is then fed to the digital signal processor and used to form a rate feedback signal which is then converted to analog form to drive the phase modulators. The same signal is employed to drive the phase modulators associated with the three gyro sensor coils. Accordingly, the modulators must possess identical operational characteristics. Otherwise, differences between the devices would most likely be reflected in differing scale factors that would adversely affect the accuracy of the device. Furthermore, such errors could be cumulative in nature with mounting bias errors eventually rendering the device useless.

SUMMARY

The preceding and other shortcomings of the prior art are addressed by the present invention that provides apparatus for measuring rotation rates about three orthogonal axes. Such apparatus includes three fiber optic gyroscopes. Each of such gyroscopes is arranged to measure rotation about one of the axes and to provide an analog output in response thereto. Three phase modulators are provided, each of which is arranged to impose a predetermined optical bias to a counterpropagating beam pair within one of the gyroscopes in response to a modulating voltage waveform.

Means are provided for multiplexing the analog outputs of the gyroscopes into an output analog waveform. An analog-to-digital converter converts the output analog waveform to digital form. A loop controller is provided for receiving the digital output waveform and generating a digital waveform for biasing the gyroscopes wherein the biasing waveform comprises sequences of digital words, alternating by axis, in which the digital words describe voltage levels for biasing the gyroscopes.

A digital-to-analog converter receives the digital biasing waveform and converts it to analog form for driving the phase modulators. The loop controller is arranged so that words relating to a particular axis are determined independently of those relating to any other axis. Means are provided for inputting a modulation sequence. The loop controller includes means for generating voltage values for incrementing the biasing waveform. Such means is responsive to the means for inputting a modulation sequence and the means for generating voltage values includes means for deriving the voltage values independently by axis.

The foregoing and other features and advantages of this invention will become further apparent from the detailed description that follows. This detailed description is accompanied by a set of drawing figures. Numerals of the drawing figures, corresponding to those of the written description, point to the various features of the invention. Like numerals relate to like features throughout both the written description and the drawing figures.

DETAILED DESCRIPTION

Figure 1A:
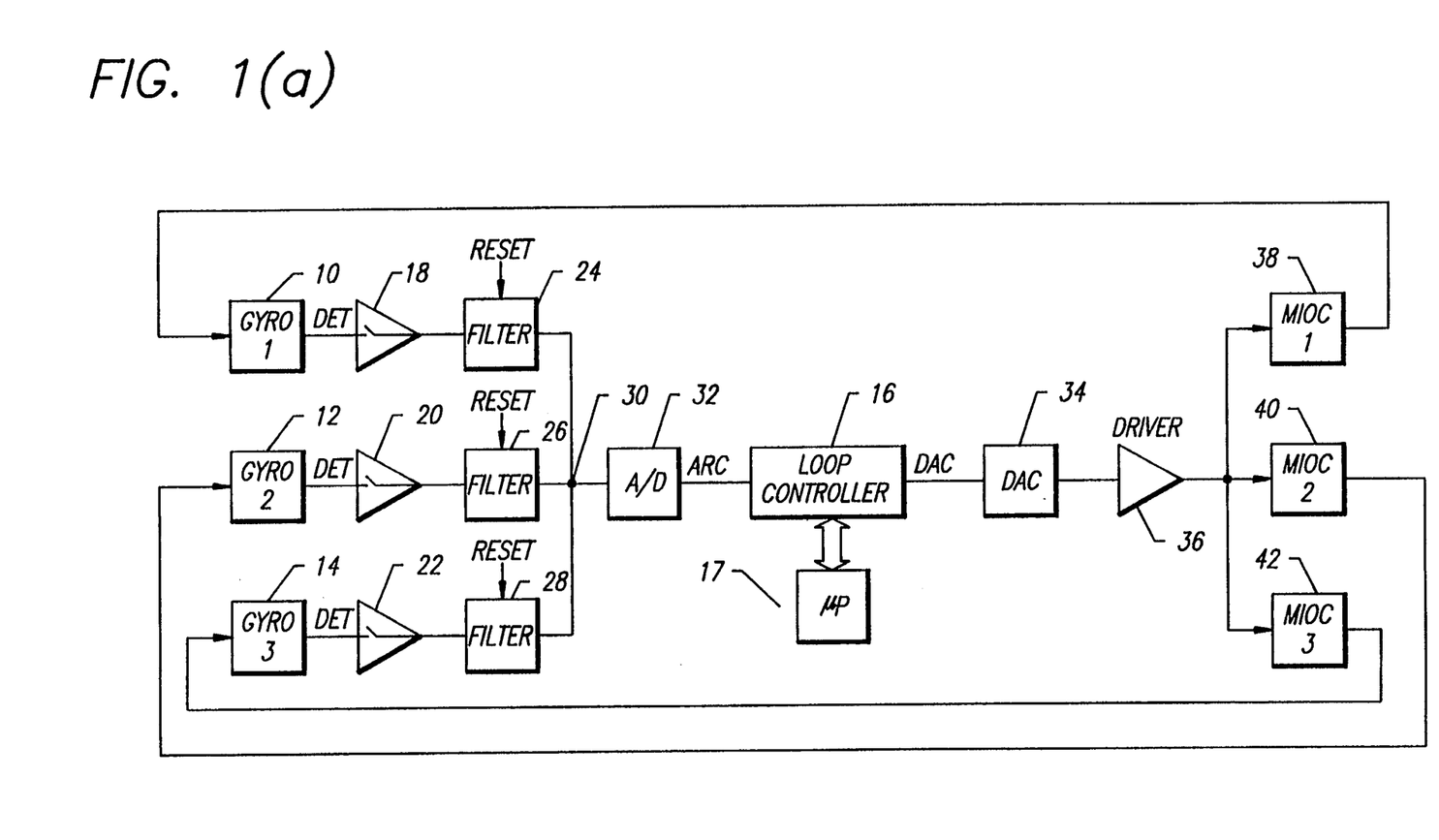
FIGS. 1(a), 1(b) and 1(c) are block diagrams of alternative multiplexed triaxial gyro systems that may employ a loop controller in accordance with the invention.

FIG. 1(a) is a block diagram of a multiplexed triaxial gyro system incorporating a loop controller in accordance with the invention. By multiplexing the outputs of gyros 10, 12 and 14 into a single stream of digital data bits for application to a loop controller 16 in accordance with the invention, the overall system eliminates numerous electronic components otherwise required for separate processing of a gyro triad.

The outputs of the rotation-sensitive gyros 10, 12 and 14 are applied to switchable preamplifiers 18, 20 and 22 respectively. Each of the preamplifiers is switched by the loop controller 16 in such a way that the output of each is blanked on an alternating basis. That is, the output of each preamplifier is switched off for two consecutive loop transit times ($\tau$) out of every three. As such, the signals applied to the filters 24, 26 and 28 comprise synchronized sequences of gyro data with each individual gyro's output during every third loop transit contributing to the total analog data utilized.

The outputs of the filters 24, 26 and 28 are combined at a node 30, so that the emerging analog signal comprises the outputs of the three gyros 10, 12 and 14 in a multiplexed or time-shared format. This composite waveform is applied to an analog-to-digital converter 32 wherein the corresponding digital waveform is generated for application to the loop controller 16.

The loop controller 16 accepts the multiplexed digital output of the analog-to-digital converter 32 and, in response, generates and provides a digital signal for use in modulating the gyros 10, 12 and 14. This digital output is applied to a digital-to-analog converter 34 whose analog output is then applied to a driver 36, the output of which drives phase modulators 38, 40 and 42 associated with the gyros 10, 12 and 14 respectively. A single waveform, generated by means of the loop controller, simultaneously drives each of the phase modulators 38, 40 and 42. As mentioned above, only one-third of loop transits of the counter-rotating light beams generate data relevant to a particular axis or gyro. Furthermore, it will be seen that the loop controller 16 is arranged so that the signal applied to the converter 34 does not include blanking periods for resetting. This permits the accumulation of twice as much information as is possible in systems that require resetting to avoid cross-axis data contamination.

As will be discussed below, the loop controller 16 is designed to perform both primary and secondary demodulation of the multiplexed gyro outputs, extracting rate data, generating and applying modulation of any predetermined form and measuring and correcting for scale factor errors. Also included is a loop gain measurement capability which makes use of a deliberate perturbation and observes the effect on the gyro output.

Figure 1B:
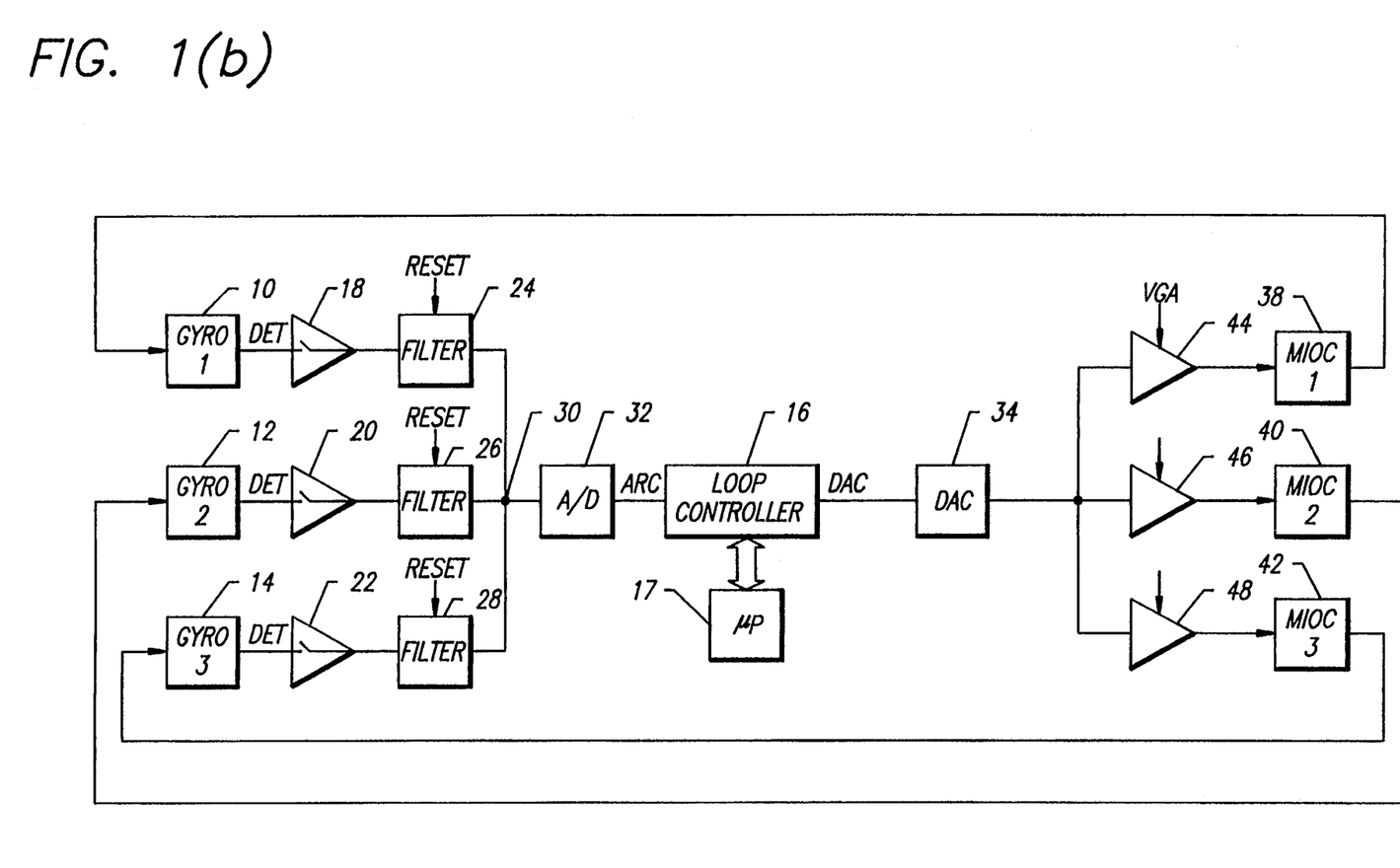
Figure 1C:
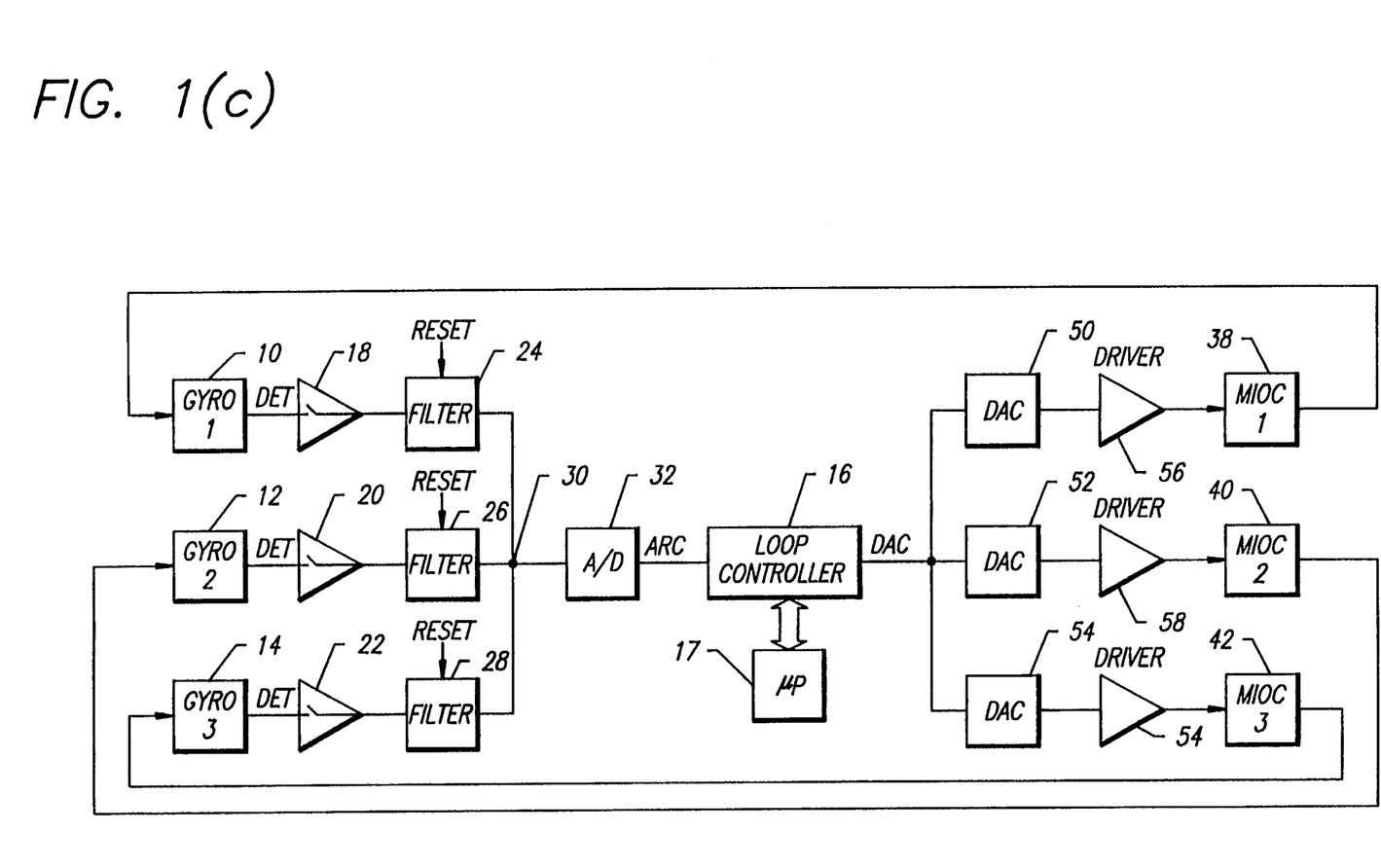

Alternative multiplexed triaxial gyro systems incorporating a loop controller 16 in accordance with the invention are shown in FIGS. 1(b) and 1(c). Each of the alternative configurations offers specific performance features not found in the system of FIG. 1(a).

In the embodiment of FIG. 1(b), the driver 36 is replaced by three variable gain amplifiers 44, 46 and 48, each associated with a phase modulator. Such substitution results in a corresponding simplification of the design of the loop controller 16 by eliminating the need to update the values stored in registers 72 and 84 (discussed below). This reflects the ability of the variable gain amplifiers 44, 46 and 48 to independently adjust the voltage output of the digital-to-analog converter 34 prior to application to the phase modulators 38, 40 and 42. The adjustability of amplifier gain allows the system (through the microprocessor) to direct appropriate scale factor adjustment signals (generated in response to the values extracted from the register bank 72, discussed below) directly to the amplified 44, 46 and 48 and to bypass modifications to the values stored in the registers 72 and 84.

The embodiment of FIG. 1(c) employs three digital-to-analog converters 50, 52 and 54, each with an associated driver 56, 58 and 60 for applying voltage signals to the phase modulators 38, 40 and 42 respectively. In this embodiment, scale factor adjustments are made by varying the reference voltages of the digital-to-analog converters. Again such adjustments would be provided by the microprocessor in response to values derived at an accumulator 120 (discussed later) of the loop controller 16. Once again, updating of the values stored in the registers 72 and 84 would be unnecessary. As opposed to the previously described alternative embodiment of FIG. 1(b), the present embodiment is subject to less noise as a consequence of the superior noise characteristic of the digital-to-analog converters vis a vis variable gain amplifiers.

Figure 2:
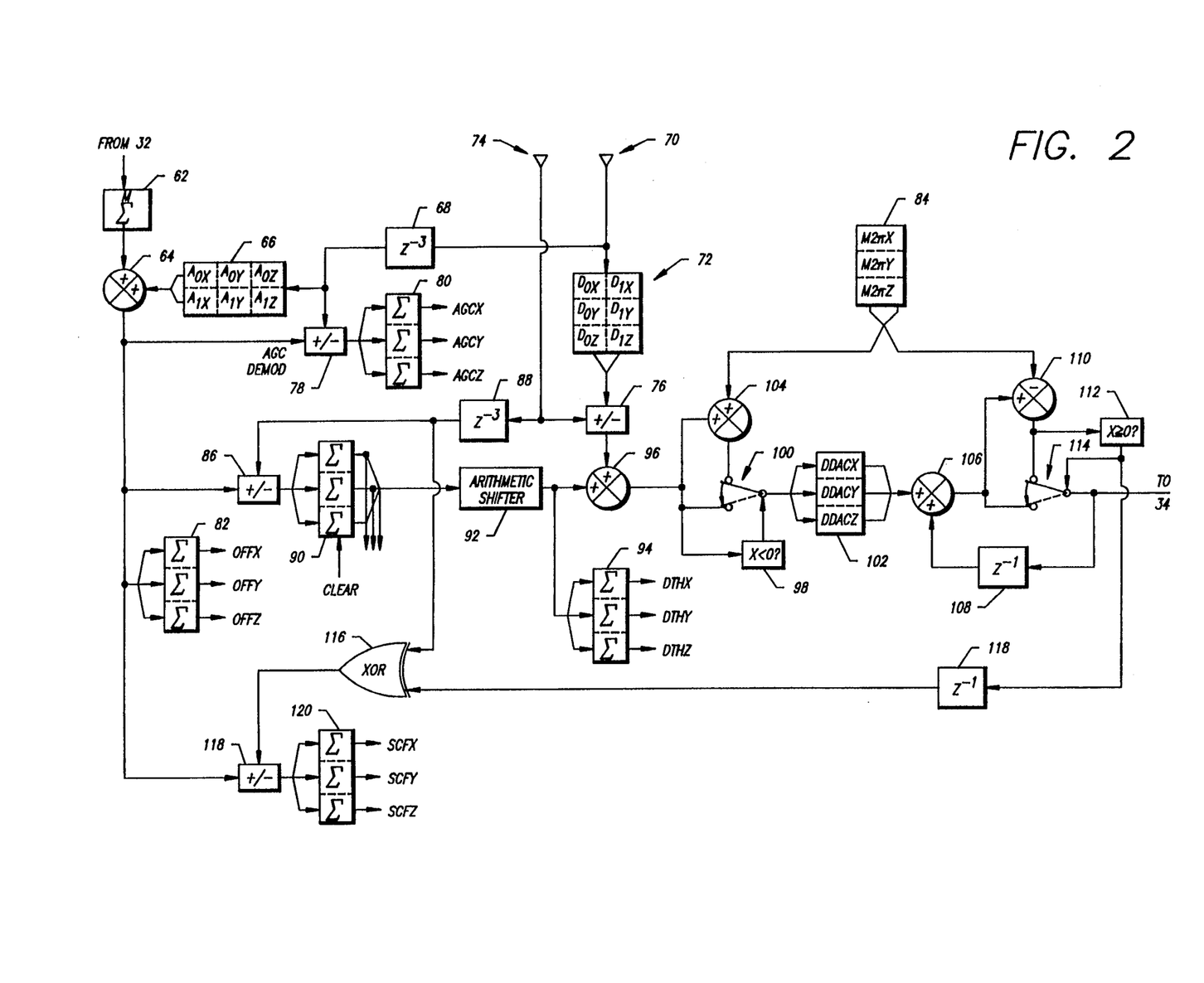
FIG. 2 is a functional block diagram of the loop controller of the invention.

FIG. 2 is a functional block diagram of the loop controller of the invention. The controller, as previously mentioned, receives the output, comprising a multiplexed stream of rotation rate data from the three gyros accumulated during the (three) prior loop transit times, of the analog-to-digital converter. It then processes this data to derive and provide a stream of (multiplexed) data that is then applied to the digital-to-analog converter for driving the three phase modulators. The modulators thereby impose the desired optical modulations of the counterpropagating beams within each of the three gyros.

A summer 62 (optional) receives the digital output of the converter. The presence of the summer 62 will allow the subsequently described processes to operate upon an average of a number of samples gathered during a single loop transit. This permits "over sampling", a technique which is well known for improving the effective resolution of digital signals. In actual practice, satisfactory results have been obtained without employing this averaging feature and, in such cases, the summer 62 may be eliminated.

The output of the summer 62, if employed, is applied to a summing node 64 where it is combined with an offset correction that is stored in a register 66. Digital values for providing offset corrections are stored within the register 66 according to gyro axis and sign to account for the measured d.c. shift in the cosine curve that is implicitly described by the output of the analog-to-digital converter. The offset corrections stored in the register are calculated and updated by the loop microprocessor and are based upon the measured loop gain and an input perturbation described below.

A delay 68 of three loop transit times is interposed between the register bank 66 and a port 70 (discussed below) so that compensation for offset at the summing node 64 will take place on an "axis-by-axis" basis. That is, a data alignment process effectively demultiplexes the data from the analog-to-digital converter. As a result, a multiplexed stream of the outputs of the three gyros emerges from the summing node 64 compensated and without errors caused by cross-axis data processing. For each axis, the line emerging from 68 selects between one of two offsets. Each of these corresponds to a value which is determined not only by constant offset but also by the perturbation deliberately injected as described below.

The sense and the magnitude of the loop perturbation values (+d or −d) to be applied are input at the port 70. In addition to their use in determining the correction values used in offset register 66, such perturbation values are entered (without a time delay) into a modulation register 72 that is internally arranged to store voltage values for producing optical phase shifts of $\pi/2+d$ and $\pi/2-d$ at one of six storage sites on an axis-by-axis basis. Such register values represent the instantaneous modulation values for application to the gyro phase modulators (discussed below.)

The sense or direction (plus or minus) of the modulation to be applied is input at a port 74, thereby selecting the sign of the modulation value at 76. The loop controller 16 is amenable to the application of modulations of all possible types (e.g. deterministic, random or quasi-random) as the port 74 may accept any sequence of "1's" and "0's" indicative of the direction of application of sequential optical bias steps.

Returning to the output of the summing node 64, a multiplexed series of compensated values, this stream of digital data is applied to a demodulator 78 that is switched between "plus" and "minus" in accordance with the sense of the loop perturbation value applied at the port 70 and delayed by three loop transit times. The offset-compensated and (now) demodulated values are then applied to an accumulator 80 whose three outputs (one separate accumulation for each axis) measure the deviation of the loop error signal from predicted values (on an axis-by-axis basis.) The outputs of the accumulator 80 are provided to the loop microprocessor 17 for adjusting loop gain whereby the result of the application of the perturbations will be as predicted.

The value output from the summing node 64 is additionally applied to an accumulator 82 (one for each axis) for measuring the average value(s) of the multiplexed signal. The three average values (by axis) are again provided to the loop microprocessor 17 for calculating the offset errors and updating the values of compensation stored in the register bank 66.

The compensated value is also applied to a primary demodulator 86 that receives an indication of the sign of the modulation (as input at the port 74) through a $3\tau$ delay 88, thereby indicating the "direction" (positive or negative) of the modulation applied during the preceding loop transit time for each axis. An accumulator 90 then receives the error signal from the demodulator 86 and adds it to the previous error signals to provide rate estimates for the three axes on an axis-by-axis basis. These estimates are provided to the loop microprocessor 17 and, in multiplexed form, applied to an arithmetic shifter 92 that acts as a multiplier, providing gain by powers-of-two. The gain applied by the shifter 92 scales the loop gain for purposes of gyro feedback.

The output of the arithmetic shifter 92, applied to the accumulator (one for each axis) 94, integrates the multiplexed signal on an axis-by-axis (demultiplexed) basis to provide measurements of $\Delta\theta$ for the three axes. In addition, the output of the shifter 92 is applied to a summing node 96 in which modulation values, selected by axis from the register bank 72, are combined with the shifted rate estimate value (from 92) of the corresponding axis derived during the most recent loop transit time. Thus, the stream of multiplexed data output from the summing node 96 comprises modulation values superimposed, axis-by-axis, upon prior demodulated rate values. The values of this multiplexed stream are then tested for sign. As will be seen below, when a negative value is detected it is converted to a positive value by addition of a $2\pi$ phase shift.

A comparator 98 determines the sign of elements of the above-described multiplexed data stream. In the event that a rate-plus-modulation value is found to be non-negative, a switch 100, controlled by the comparator 98, is moved to the closed position (shown by dashed line) and applied directly to a register bank 102 that sorts the values by axis. In the event that a negative value level is detected at the comparator 98, a value corresponding to a $2\pi$ phase shift is added to the signal from the node 96 at a summing node 104. (Values corresponding to $2\pi$ phase shifts are stored by axis in a register bank 84. It will be seen later that these values are updated throughout the loop control process in accordance with a scale factor adjustment mechanism discussed below.) Thus, a signal comprising a stream of digital words defining non-negative values is input to the register bank 102. The values sorted in the register 102 provide the digital representation of voltage changes or increments DDACX, DDACY and DDACZ, (from the prior three loop transits) that are to be sequentially made to the previous modulator voltage to drive the phase modulators 38, 40 and 42 (through the digital-to-analog converter 34) during the next three loop transits. Thus, the incremental voltage changes DDACX, DDACY and DDACZ are selected to produce phase shifts between the counterpropagating beams within the gyros 10, 12 and 14 of $\pi/2 \pm d + \Delta\theta$ (corresponding to a positive value detected at the comparator 98) and $3\pi/2 \pm d + \Delta\theta$ (corresponding to a negative value detected at the comparator 98). The values input to the register bank 102 vary with the position of the switch 100.

While a single voltage is commanded to the converter 34 at any given time and a single equivalent analog voltage waveform drives the modulators associated with each of the x, y and z axes, it should be recalled that, in processing the gyro outputs, the data from two of every three gyro loop transits is blanked or ignored in independently deriving DDACX, DDACY and DDACZ. Accordingly, the "combined" drive waveform is not subject to cross-axis based errors that might occur if axes were combined during the derivation process. Rather, the analysis of gyro outputs and the derivation of modulation signals takes place independently (in terms of axes), allowing the generation of a common drive signal in which specific portions are "targeted" axis by axis.

It will be seen that, in combination with subsequent signal processing (to be discussed), the voltage increments DDACX, DDACY and DDACZ are added to the existing modulation voltages to drive the phase modulators associated with the gyros without resetting or clearing the prior state of the converter 34. This means that each gyro effectively "takes off" where the prior gyro ended. Since, as mentioned above, the loop is closed by processing the axes independently, then combining, threshold selecting and updating in a common system, one is assured that the multiplexed stream applied to the converter 34 includes independently generated data for each of the three axes. It is the incrementing of a common drive signal with independently-derived voltage adjustments that permits the system to operate without continual resetting. As a result, the system achieves twice the measurement sensitivity of a loop controller that must "cycle" an output digital-to-analog converter. The dedication of "buffer cycles" between the three channels via resetting would slow the analysis of data to 1:6 loop transits per axis thereby significantly limiting bandwidth.

The incremental values are output from the register bank 102 in a multiplexed signal that is then input to a summing node 106. The summing node 106 also receives the latest value commanding the digital-to-analog converter 34 (and, thus, the voltage applied to the phase modulators 38, 40 and 42) through a $\tau$ delay 108. This signal, whose elements constitute the values for driving the phase modulators, is applied to a difference node 110, as is a value corresponding to a $2\pi$ phase shift (from the appropriate register bank 84). The difference voltage is then applied to a comparator 112 that controls the position of a switch 114. When the comparator 112 detects a negative value, the stream from the summing node 106 will not require resetting as this indicates that the value of the voltage waveform corresponds to the range of 0 to $2\pi$. In this event, the switch 114 is set to a position (indicated by dashed line) that directs the output from the summing node 106 to the digital-to-analog converter 34 and to the delay register 108.

When either a positive or zero value is detected at the comparator 112, a "RESET" condition is indicated. In such a case, the switch 114 is moved to the position indicated by the solid line and the output of the difference node 110, rather than that of the summing node 106, is directed to the digital-to-analog converter 34. Of course, regardless of the position of the switch 114, the signal comprising previous multiplexed DDACX, DDACY and DDACZ values is fed back to the summing node 106 so that the voltage waveform output to the converter 34 is cumulative, containing the "integrated" values and not voltage increments, for driving the phase modulators 38, 40 and 42. Thus, the summing node 106 and the $\tau$ delay 108, in combination, act as an integrator.

In addition to selectively actuating the switch 114, every time an evaluation is made, the comparator 112 provides an indication, whether "RESET" or "NO RESET" to an exclusive-OR gate 116 through a $\tau$ delay 118. The detection of a RESET at the comparator 112 triggers a process for determining and correcting scale factor error. Such error may exist either in the values, stored in the register bank 72, for affecting $\pm\pi/2$ modulation or in the values, stored in the register bank 84, that correspond to $2\pi$. The exclusive-OR gate 116, after $\tau$ delay, receives an indication (RESET or NO RESET) at one input and the sense (positive or negative) of the modulation delayed by $3\tau$ at its other input. (The delays 88 and 118 differ by $2\tau$ to account for the duration of various computations.)

As discussed above, only non-negative values are stored in the register 102. When $-\pi/2$ modulation is detected at the comparator 98, a $2\pi$ shift is superimposed and the modulation is converted to $3\pi/2$. A $+\pi/2$ modulation is not modified.

It can be shown that, when a scale factor error is present, the inputting of a $3\pi/2$ modulation "step" will produce an error in signal intensity that is minus three times that which would result from a $\pi/2$ modulation step. A scale factor error determination can therefore be made by differentiating between $\pi/2$ and $3\pi/2$ modulation values. If a modulation value $+\pi/2$ (positive direction) causes a reset in the subsystem comprising 106, 108, 110, 112, and 114 described above, then the $+\pi/2$ will be converted into a $-\pi/2$. The XOR (exclusive OR) performed by 116 in this case will indicate a $+3\pi/2$ condition. If a reset was not generated, then the modulation will remain $+\pi/2$ and XOR 116 will indicate a $\pm\pi/2$ condition.

On the other hand, if the modulation direction (commanded by 74) is reversed, then the $-\pi/2$ modulation will be converted to $+3\pi/2$ by the subsystem comprised of 98, 100 and 104 discussed above. If the $3\pi/2$ does not cause a reset, then the XOR 116 will indicate a $\pm 3\pi/2$ condition. If a reset is generated then the $+3\pi/2$ is converted back into a $-\pi/2$ and this will be again indicated by XOR 116. In summary, a positive direction with no reset yields an XOR of 1 and a $+\pi/2$ modulation. A positive direction with a reset yields an XOR of 0 and a $-3\pi/2$ modulation. A negative direction with no reset yields an XOR of 0 and a $+3\pi/2$ modulation. A negative direction with a reset yields an XOR of 1 and a $-\pi/2$ modulation. Overall the XOR 116 is able to distinguish $\pm\pi/2$ from $\pm 3\pi/2$ applied modulation.

The output of the gate 116 is applied to a demodulator 118 that also accepts the multiplexed gyro output signal. The output of the demodulator 118 is entered into an accumulator 120 that sorts and sums the product of the multiplexed gyro output signal and the output of the gate 116 by axis. The demodulator 118 is arranged to employ gate 116 outputs (that distinguish between a $\pm\pi/2$ and $\pm 3\pi/2$ modulation steps) to assign the appropriate sign to the intensity values of the gyro output signal. Since, as discussed above, any error in signal intensity resulting from $3\pi/2$ modulation should be minus three times that resulting from a $\pi/2$ modulation step, the demodulator rectifies intensity signals due to scale factor error. The outputs of 120 provides a measure of the scale factor error on each axis.

In the event that net values should accumulate in the accumulator 120, such net values will provide measures of scale factor error on an axis-by-axis basis. In the event that the loop controller 16 is employed with a triaxial gyro system of the type illustrated in FIG. 1(a), such values, input to the microprocessor 17, would be utilized to generate corrective values for adjusting the voltages (represented as digital values) stored in the registers 72 and 84 to correct the voltage values for affecting $\pi/2$ and $2\pi$ phase shifts respectively in the gyros. In the event that the controller 16 is employed with a triaxial system of the type illustrated in FIG. 1(b), the data stored in the accumulator 120 is utilized to adjust the gain of the variable gain amplifiers 44, 46 and 48. Finally, in a system according to FIG. 1(c) the data is employed by the microprocessor 17 to adjust the reference voltages of the digital-to-analog converters 50, 52 and 54.

Thus it is seen that the present invention provides a loop controller for a multiplexed triaxial gyro system. The controller provides numerous advantages in triaxial gyro systems of varying configurations. By independently processing data associated with each of the three axes and then combining the derived modulation inputs into a composite drive signal, it is possible to process and control the three gyros without the introduction of buffer cycles that otherwise limit accuracy and bandwidth. Further, the controller provides the system with an elegant means for correcting scale factor errors on an axis-by-axis basis.

While this invention has been described with reference to its presently-preferred embodiment, it is not limited thereto. Rather, this invention is only limited insofar as it is defined by the following set of patent claims and includes all equivalents thereof within its scope.

What is claimed is:

1. Apparatus for measuring rotation rates about three orthogonal axes comprising, in combination:
    a) three fiber optic gyroscopes, each of said gyroscopes being arranged to measure rotation about one of said axes and to provide an analog output in response thereto;
    b) three phase modulators, each of said modulators being arranged to impose a predetermined optical phase bias to a counterpropagating beam pair within one of said gyroscopes in response to a modulating voltage waveform;
    c) means for multiplexing the analog outputs of said gyroscopes into an output analog waveform;
    d) an analog-to-digital converter for converting said output analog waveform to digital form;
    e) a loop controller for receiving said digital output waveform and generating a digital waveform for biasing said gyroscopes, said biasing waveform comprising sequences of digital words, alternating by axis, wherein said words describe voltage levels for biasing said gyroscopes;
    f) a digital-to-analog converter for receiving said digital biasing waveform and converting it to analog form for driving said phase modulators;
    g) said loop controller being arranged so that digital words relating to a particular axis are determined independently of those relating to any other axis;
    h) means for inputting a modulation sequence; and
    i) said loop controller including (i) means for generating voltage values for incrementing said biasing waveform, (ii) said means being responsive to said means for inputting a modulation sequence; and (iii) said means for generating voltage values includes means for deriving said voltage values independently by axis.

2. Apparatus as defined in claim 1 wherein said modulation sequence is a random sequence.

3. Apparatus as defied in claim 1 wherein said modulation sequence is pseudo-random.

4. Apparatus as defined in claim 1 wherein said modulation sequence is deterministic.

5. Apparatus as defined in claim 1 further including means for combining said voltage values with said biasing waveform on an axis-by-axis basis.

6. Apparatus as defined in claim 5 further including means for resetting said biasing waveform.

7. Apparatus as defined in claim 6 wherein said means for resetting further includes:
    a) means for comparing each value of said waveform with a voltage for producing a $2\pi$ phase shift in the gyro associated with the corresponding axis;
    b) means for selecting between said waveform and said waveform decremented by $2\pi$ for application to said digital-to-analog converter; and
    c) means for generating a RESET signal when said waveform is decremented by $2\pi$.

8. Apparatus as defined in claim 7 further including:
    a) means for adjusting scale factor; and
    b) said means includes means for determining scale factor error on an axis-by-axis basis.

9. Apparatus as defined in claim 8 wherein said means for determining scale factor further includes means for demodulating said digital output waveform.

10. Apparatus as defined in claim 9 wherein said means for demodulating said digital output waveform further comprises:
    a) an exclusive-OR gate;
    b) said exclusive-OR gate being arranged to receive said modulation sequence and said RESET signals;
    c) a multiplier for synchronously multiplying said digital output waveform by the output of said exclusive-OR gate; and
    d) an accumulator for receiving and storing the outputs of said multiplier on an axis-by-axis basis whereby the content thereof is related to scale factor error.

11. Apparatus as defined in claim 10 further including means for adjusting predetermined registers of said loop controller in response to the content of said accumulator.

12. Apparatus as defined in claim 11 wherein said registers include:

a) a register for storing voltages for effecting substantially $\pm\pi/2$ phase shifts between counter rotating light beams in said gyros on an axis-by-axis basis; and b) a register for storing voltages for effecting $2\pi$ phase shifts between counter rotating light beams in said gyros on an axis-by-axis basis.

13. Apparatus as defined in claim 10 further characterized in that:

a) each of said modulators is driven by a variable gain amplifier; and b) the gain of each of said amplifiers is adjustable in response to the content of said accumulator.

14. Apparatus as defined in claim 10 further characterized in that:

a) each of said phase modulators is driven by a dedicated digital-to-analog converter; and b) the reference voltage of each of said digital-to-analog converters is adjustable in response to the content of said accumulator.

* * * * *